US00RE34873E

United States Patent [19]

Luttrell

[11] E Patent Number: Re. 34,873

[45] Reissued Date of Patent: Mar. 14, 1995

[54] AERIAL GUNNERY TARGET SYSTEM

[75] Inventor: Clyde K. Luttrell, New Market, Ala.

[73] Assignee: Teledyne Industries Inc., Los Angeles, Calif.

[21] Appl. No.: 194,429

[22] Filed: Feb. 10, 1994

Related U.S. Patent Documents

Reissue of:

[64] Patent No.: 5,102,145
Issued: Apr. 7, 1992
Appl. No.: 686,345
Filed: Apr. 16, 1991

[51] Int. Cl.[6] ..... F41J 9/10
[52] U.S. Cl. ..... 273/360; 244/1 TD
[58] Field of Search ..... 273/360, 361; 294/83 R; 244/3; 40/215

[56] References Cited

U.S. PATENT DOCUMENTS

| | | | |
|---|---|---|---|
| 2,011,202 | 8/1935 | Satterlee | 40/215 |
| 2,011,302 | 8/1935 | Satterlee | 40/127 |
| 2,064,218 | 12/1936 | Richardson | 40/215 |
| 2,523,738 | 9/1950 | Trimbach | 273/361 |
| 2,604,324 | 7/1953 | Weir | 273/361 |
| 2,751,167 | 6/1956 | Hopper et al. | 273/361 X |
| 2,777,696 | 1/1957 | Magill | 273/361 |
| 3,088,693 | 5/1963 | Brown | 244/3 |
| 3,135,511 | 6/1964 | Norman et al. | 273/360 |
| 3,895,767 | 7/1975 | Maughlin et al. | 244/3 |
| 4,019,771 | 4/1977 | Perez | 294/83 R |
| 4,184,681 | 1/1980 | Graham, Jr. | 273/360 |
| 4,305,848 | 6/1980 | Smith et al. | 273/361 |
| 4,496,159 | 1/1985 | Dugan et al. | 273/361 |
| 5,026,073 | 6/1991 | Luttrell et al. | 273/360 |
| 5,102,145 | 4/1992 | Luttrell | 273/360 |

FOREIGN PATENT DOCUMENTS

WO A
9012996 11/1990 WIPO .

OTHER PUBLICATIONS

Teledyne Brown Engineering, "Aerial Gunnery Target Set", A/A37U-36, Aug. 14, 1987.

*Primary Examiner*—William H. Grieb
*Attorney, Agent, or Firm*—Beveridge, DeGrandi, Weilacher & Young

[57] ABSTRACT

An aerial gunnery target system having a visual augmenter release which includes a detention member that is moved to enable a spring biased rod to shift forward. The rod moves a pivoting contact member received within a bracket assembly extending from an end cap secured to the aft end of a towed forebody. The shifting of the rod causes the contact member to pivot so as to move the swivel connector of the visual augmenter from a position fixed within the bracket assembly to a position where the swivel connector is free to slide off. A deployment mechanism is also provided which includes a cutting assembly designed to cut a retention line extending about an end cap formed at the aft end of the forebody and about a two segment visual augmenter cover A transient force absorbing adaptor is connected between the tow cable and forebody. A cone shaped ballast member redirects projectiles so as to protect the scoring sensor. Snap strings joint the cover assembly to a collapsible augmenter to help in deploying the augmenter.

38 Claims, 11 Drawing Sheets

FIG. 3
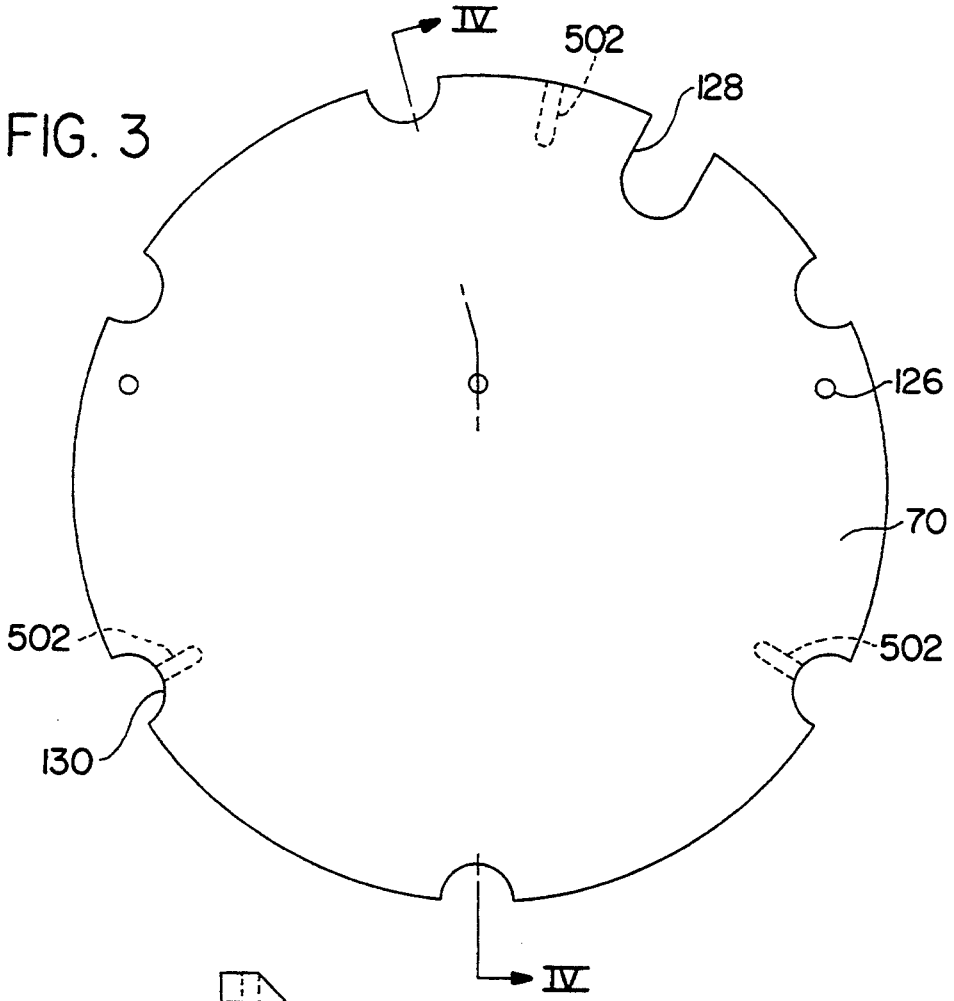
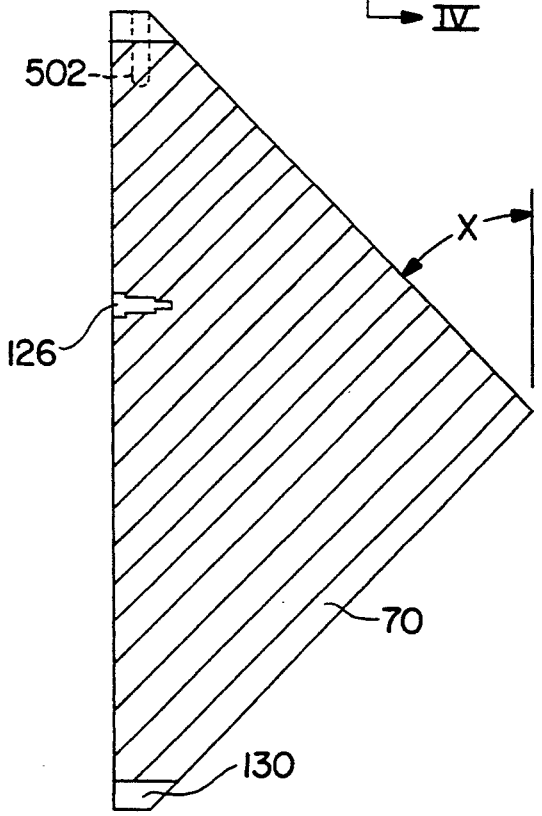
FIG. 4

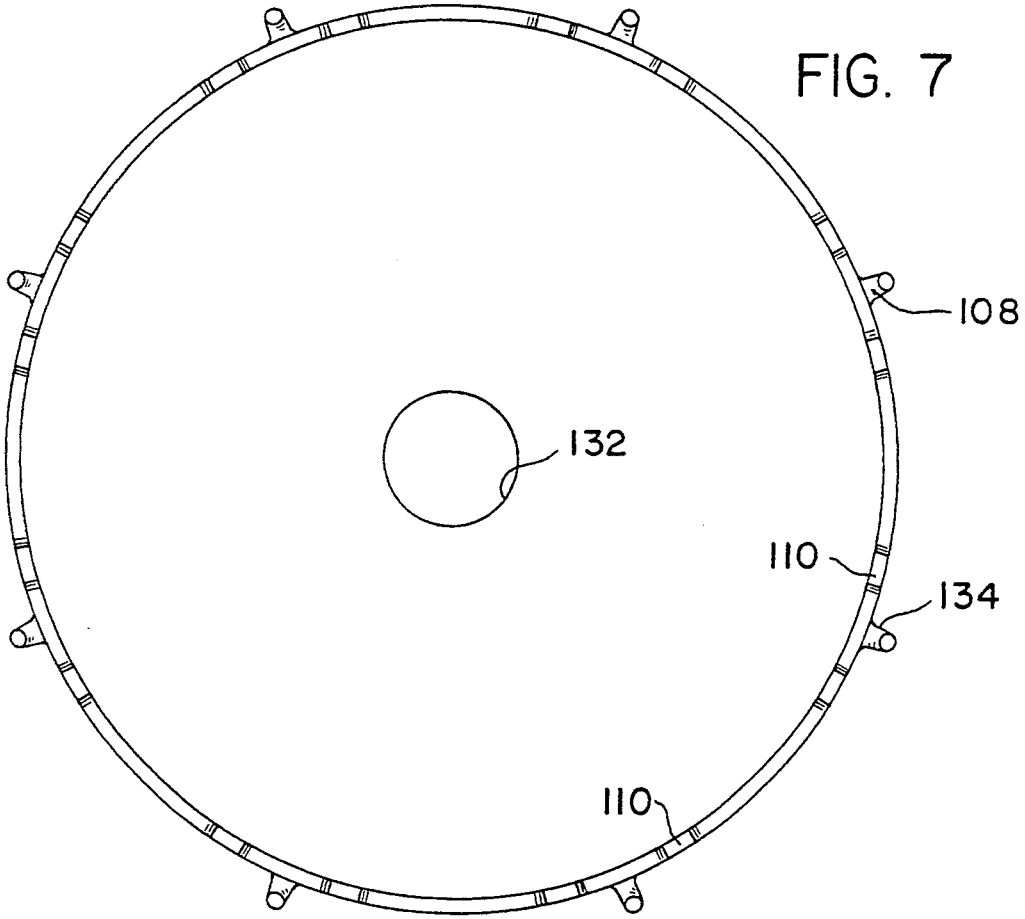
FIG. 7
FIG. 9
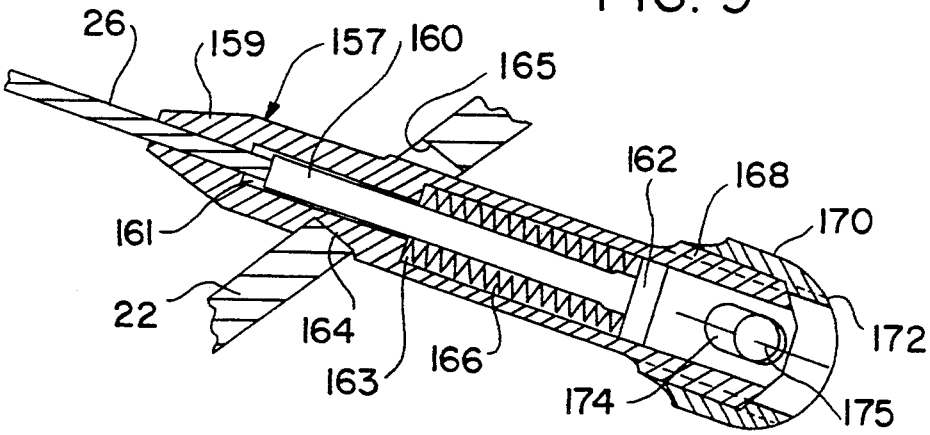

FIG. 8A
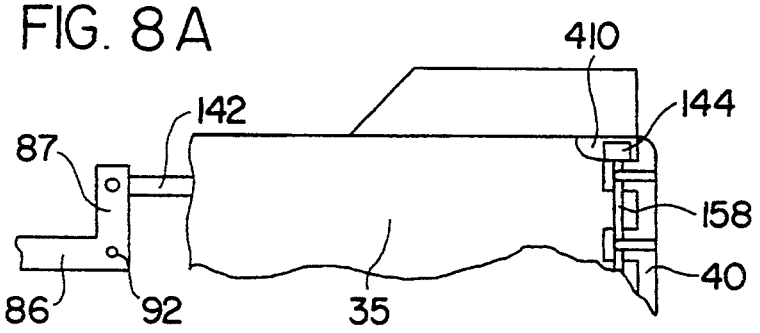
FIG. 8B
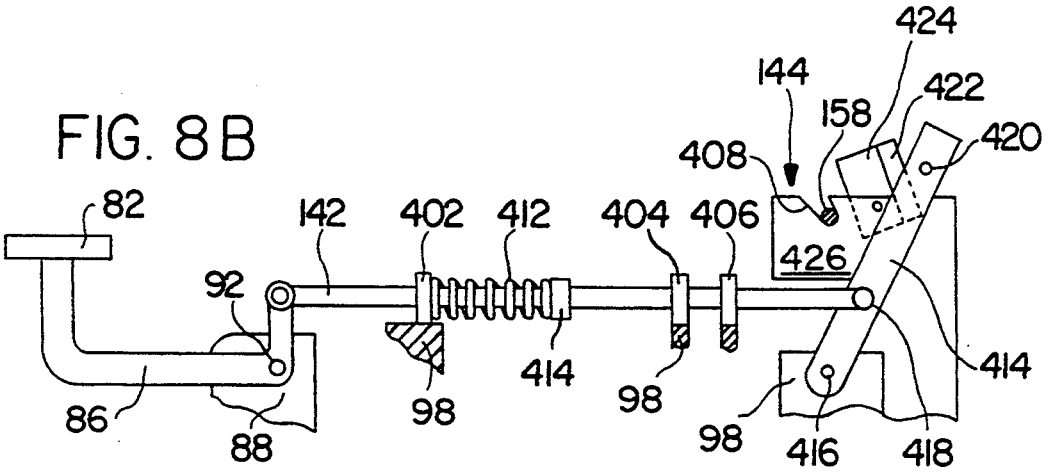
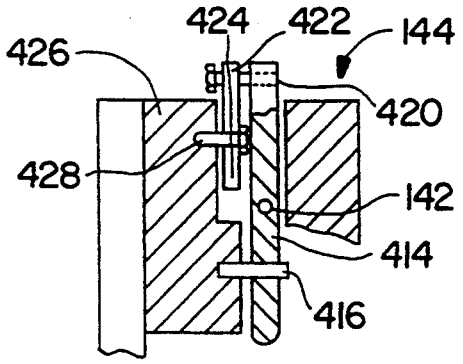
FIG. 8C

AERIAL GUNNERY TARGET SYSTEM

Matter enclosed in heavy brackets [ ] appears in the original patent but forms no part of this reissue specification; matter printed in italics indicates the additions made by reissue.

FIELD OF THE INVENTION

The present invention relates to an aerial gunnery target system which is dragged by a towing aircraft and includes a visual augmenter and a deploy-release assembly.

BACKGROUND OF THE INVENTION

To improve the shooting and pursuit skills of aircraft pilots, various types of targets have been developed which are towed behind a towing aircraft. Some of the earlier target constructions included elongated fabric panels or sleeves. These targets were attached to a bridle assembly which, in turn, was attached to a long cable secured to a towing aircraft. These banner and sleeve targets were often placed in flight by dragging both the target and at least a portion of the tow cable off of a runway. Scoring was accomplished by counting the number of holes created by bullets passing through the target. Scoring was highly competitive among aircraft pilots and, to distinguish one pilot from another, different color pigments were used to coat the bullets.

With the development of higher speed aircraft, the cloth banner and sleeve targets proved unsuitable as they rapidly deteriorated upon reaching the speeds achievable with the higher speed aircraft. To overcome this problem the air relied more heavily on solid body targets which could be designed to handle the higher speeds. However, the solid body targets (e.g., fiberglass covering a wooden or metallic framework) rapidly deteriorated after being hit a few times by pursuing aircraft bullets and thus were unsuitable for reuse. This problem remained despite the development of more sophisticated scoring indicators such as those using acoustic, radar, optical or radiation to monitor the passage of bullets through the target areas. Such scoring systems allowed for the creation of a scoring field about the trailing device (thus the nomenclature visual augmenter), but pilots would inevitably hit the trailing device while shooting for the field surrounding the visual augmenter.

To overcome the problems associated with solid body trailing devices, there has been developed in the art visual augmenters, capable of flying with higher speed aircraft. Examples of high speed visual augmenters can be found in U.S. patent application Ser. No. 07/343,438 (filed Apr. 26, 1989) and U.S. patent application Ser. No. 07/536,112 (filed June 8, 1990) which is a continuation-in-part of the above application. Both the above-noted applications are incorporated herein by reference.

An advantage of visual augmenters like those described in the above noted applications is that they are capable of numerous runs as that they are not prone to deteriorating at high speeds and are not rapidly deteriorated by projectile hits. Moreover, such visual augmenters are highly compactable, especially those embodiments described in the above two noted patent applications since the forward portion of the augmenter comprises a flexible and readily foldable vented inflator. Hence the prior art problems associated with dragging targets off a runway (e.g., difficult pre-flight set up, friction deterioration, snagging, safety problems) are avoided.

The high cost involved with target practice sorties, however, necessitates that in flight deployment of stowed visual augmenters occur rapidly and without complications. Problems experience with a prior art devices utilizing stowed targets or stowed augmenters (e.g. U.S. Pat. Nos. 4,184,681; 4,205,848; 2,777,696) include non-release of the augmenter (target) at the appropriate time (if at all), partial release of the support structure or augmenter (target), tangling of bridle or tow lines, breakage of tow or bridle lines (e.g., burn through with exhaust), and failure of components due to the high forces which develop during and following deployment.

It is also very important that release of the target properly take place at the designated time as a release failure leaves the pilot in the precarious situation of attempting to land with the dangling augmenter (target). On the other hand, prior art attempts to avoid this problem have resulted in releasing devices which work prematurely.

A further problem which has plagued the art is the destruction of the costly electronic scoring equipment due to misfires hitting in the storage are a of the scoring equipment (e.g., RF sensor). For the prior art devices which release the scoring equipment together with the augmenter an additional problem lies in the destruction of the equipment on ground impact.

An additional problem experienced in the art has been cable breakage. Prior art attempts to avoid tow line breakage include providing high factors of safety through thickened cables. An increase in tow cable thickness, however, leads to undesirable fuel consumption brought on by the added weight and drag of the cable. The high speed aircraft travelling at speeds in excess of 450 KNTS place extremely high tensile stresses on the cable which often extends more than 2000 ft behind the aircraft. Even higher tensile stresses are placed on the cable due to transient forces which develop in flight. For example, when the solid components of the target are hit by projectiles the target shifts side-to-side or front-to-back so as to cause a snapping or whipping of the cable and a large increase in stress on the cable. An increase in cable stress is also caused by the maneuvering of the towing plane and environmental conditions (wind shear, pressure pockets).

Rapid field replacement or repair in the field is also a requirement in the art as often only a limited number of target systems are available for use within a predesignated flight schedule. Typical prior art systems fail to provide such replacement or repair versatility, especially in the repair and replacement of the sensitive electronic components.

SUMMARY OF THE INVENTION

The present invention provides an aerial gunnery target system which is advantageously designed to avoid the aforementioned problems in the prior art. In addition, components of the present invention, such as the below discussed deploy/release assembly are also readily adaptable to other uses including, for example, the release and deployment of towed advertisements, the release of gliders the release of cargo, etc.

The aerial tow target system of the present invention utilizes a real-time electronic scoring system. A tow reel pod is mounted to a tow plane bomb rack and houses the reel, cable and mechanical drivers or actuators to deploy and sever the target. A forebody includes a canister which carries the electronic scoring system and the mechanical systems for visual augmenter deployment and visual augmenter disconnect. The visual augmenter is folded inside a plastic cover assembly and is affixed to the forebody aft end until deployment.

The tow reel, target forebody, cover assembly and visual augmenter fit compactly under the tow aircraft bomb rack. The forebody mounts to the tow reel pod, with the target packed inside a plastic housing and secured to the canister aft section. On command from the tow plane pilot, the visual augmenter deploys the trails some 40 feet behind the tow forebody and is retained by eight riser lines. Two seconds later the target forebody begins to move aft as the tow cable unwinds and extends as far as 2000 feet behind the tow plane.

While the visual augmenter is under active attack, hits and near misses are registered by a radar sensor system carrier in the target forebody. The results are processed and radio frequency transmitted to the tow reel affixed to the plane and then relayed to the attack plane for real time scoring. At the end of the mission, the forebody is reeled back and locked into place under the reel pod. After the forebody is locked into the tow reel saddle, the visual augmenter is released and discarded into the air stream.

The tow reel assembly housing is mounted to the tow plane bomb rack and is controlled through the aircraft armament electrical wiring. The reel is driven by an air turbine and gear box, and the drum carries a 3500 feet length of $\frac{1}{8}$ inch steel tow line.

The forebody is a hollow aluminum tube measuring 10 inches in diameter and 70 inches long. Four fixed stabilizing fins are mounted aft and a spherical aluminum nose is fastened to the forward end. The forward housing carries a D.C. battery pack and an electronics package which includes a radar signal generator, a signal processor, a transmitter, and a flat plate telemetry antenna. This section is protected by a steel ballast plate and RF seal. The electronics package is connected electronically to transmit and receive antennas mounted in the aft section of the forebody. On the forebody upper surface is a power enable switch which energizes the electrical system when the forebody separates from the tow reel pod.

A tow bracket is mounted midway of the canister upper surface, over the center of gravity, for attaching the steel cable tow line through an adapter. The adapter incorporates a shock (transient suspension) absorber device to reduce shock transient caused forces. Farther aft, along the top centerline are two circular aluminum pads, flush with the forebody surface. These pads are part of the below described release and deployment systems, which when actuated will deploy the visual augmenter from its prepackaged cover assembly container and will release the visual augmenter and suspension lines to severe connection with the forebody.

The visual augmenter is folded and housed in a two-piece plastic cover assembly which is attached to the forebody aft end. The visual augmenter is a diamond weave mesh material sleeve measuring 30 feet in length and 30 inches in diameter. Prior to deployment, the cover assembly is secured to the forebody aft end by a $\frac{1}{8}$ inch nylon line, hooked over detented slots in the target aft end cap casting. This line also passes through a spring-loaded cutter mechanism, fitted with a single edge razor blade. On the command to deploy, the tow reel pod mechanically depresses the aft circular pad on the canister upper surface. This force releases a spring-loaded arm which holds the razor blade and severs the retainer line. Drag forces separate the plastic housing which covers the visual augmenter and the visual augmenter sleeve deploys aft some 40 feet behind the forebody and 2000 feet behind the tow reel of the tow plane. The forward end of the visual augmenter sleeve has an inflator section which causes the sleeve to inflate. The sleeve is in three equal color segments—white—black—yellow.

The mechanical systems which control deployment and separation of the visual augmenter are located in the forebody aft section.

The forebody aft section has the four stabilizing fins and the radar scoring system YAGI ANTENNA elements. There are two antennae mounted 180° apart between the fins; one transmits a signal which envelopes the visual augmenter, the second serves as a receiver antenna. Projectiles passing through the envelope are registered and scored by the signal processor and telemetered to the tow plane through the forward flat plate telementry antenna.

The release system of the present invention includes a support structure with a rod supported by the support structure which is adapted to move with respect to the support structure between a first rod position and a second rod position.

Attached to the rod is a biasing device (e.g., a spring). The towed member release system also includes a movable detention device preferably in the form of a pivotable lever which pivots to a first position wherein the end of the detention device is in contact with one end of the rod so as to maintain the rod in the first rod position. The detention device is adapted to pivot into a second position wherein the detention device is positioned such that the biasing device shifts the rod to the second rod position.

The release system further includes a contact member supported by the bracket assembly extending off the end cap. The contact member is adapted to move (e.g., pivot) to a first contact member position. The rod, when in the first rod position, maintains the contact member in its first position. The rod, in shifting to the second rod position, places the contact member in its second position. The bracket assembly and contact member are dimensioned and arranged so as to fix a towed member (visual augmenter) in place when the contact member is in its first position and release the towed member when in its second position.

The first end of the rod includes a head member having a visco plastic surface which is in contact with the end of the pivoting lever when in the first position. The visco plastic surface (e.g., TEFLON (TM)) facilitates movement of the end section of the lever out of abutting relationship with the head when the lever pivots to the second position.

The support structure includes a pair of spaced apart arms having bearing surfaces for receiving the rod through the arms. The rod includes a first collar and the spring (biasing device) is positioned between the first collar and the arm positioned furthest from the rod's first end. The spring is in a compressed state when the rod is in its first rod position.

The rod also includes a second and a third collar positioned in spaced apart relationship at the second end of the rod. The collars are positioned on opposite sides of the contact member when the rod and contact member are in their first position. The third collar is spaced further from the first end of the rod than the second collar and the contact member includes an inclined edge which slopes downwardly away from the third collar and towards the second collar such that the inclined edge forms a cam surface with respect to the third collar. The third collar is adapted to ride upon the cam surface as the rod shifts from its first to second position and the contact member pivots about a pivot pin forming part of the bracket assembly.

The bracket assembly includes a pair of spaced wall extensions positioned on opposite sides of the pivoting contact member. The wall extensions each include a slot above the pivot point of the contact member and the contact member, itself, has a section above the pivot pin which is dimensioned to receive over its end a section of the towed member when said contact member is in the second contact member position. The slots are dimensioned to receive therein a portion of a swivel connection loop forming part of a towed member so as to fixedly retain the towed member to the bracket when the contact member and rod are in their first position.

The second and third collars are sufficiently spaced apart such that the contact member is free to pivot to a position in between the second and third collars while the rod is being shifted from the second rod position to the first rod position.

The deployment system of the present invention includes a line cutting system and a second lever pivotably fixed to the support structure.

The line cutting system includes a rod with a collar also slidingly supported by the support structure. The second lever includes an extension member extending vertically from a pivot point with the support structure. When the lever is depressed, the extension member pivots so as to move the rod forward and compress the spring positioned between an arm of the support structure and the fixed collar.

At the aft end of the forebody, the support structure supports a blade a housing which includes an angled slot (e.g., 33°) for a receiving a retention string or line. Pivotably supported by the blade housing is a razor. Aft of the razor is positioned a lever pivotably supported by the support structure at its lower end and having a cam bar in contact with the aft base of the razor which forms a cam surface. The rod is attached to the lever between the cam bar and its lower pivot point such that when the rod is moved forward the lever is rotated. Rotation of the lever (e.g., counter clockwise) causes the cam bar to ride along the back of the razor blade such that the razor blade rotates counter clockwise through the retention line so as to cut the line.

As noted above, the present invention features an aerial gunnery target system which comprises a forebody having a forward nose cone section and a cylindrical main body with an aft end. The forebody includes means for connecting with a tow cable which includes a structure secured to the main body and positioned in line above the center of gravity of the forebody. The forebody also includes an end cap securely fixed to the aft end of the forebody's main body. The end cap includes a base member and a flange section extending forward of the base member. Securement means in the form of screws or the like secure the flange section to the aft end of the forebody. The end cap further includes the aforementioned bracket assembly which extends off of the base member in a forward to aft direction.

The flange section of the end cap includes a plurality of thickened portions separated by recesses, and the securement means includes members (e.g., screws) extending through the thickened portions and the aft end of the main body. The base section features an aperture formed in a central portion of the base member. An aperture is formed in the aft end of the main body which is aligned with one of the recesses such that the retention line can be inserted in the angled slot.

The deployment system further includes protruberances extending off of the flange section of the end cap which are equally spaced about the exterior periphery of the flange section. The protruberances include the aforementioned line retention recesses formed at a forward end of the protruberances.

The present invention further includes a visual augmenter assembly which includes a visual augmenter main body preferably formed of a diamond shaped mesh, a vented inflator, a set of riser lines and a swivel connector. The deployment system also includes a cover assembly to cover the compacted visual augmenter. The deployment system includes a retention wire threaded through line receiving means formed in the cover assembly and the retention line is adapted to hold the cover to the forebody when the retention line is received within the line retention recesses formed in the protruberances.

The cover assembly includes a first cover segment and a second cover segment and a hinge joining the first and second cover segments at their aft end. The retention line (e.g., nylon string) is arranged so as to maintain the first cover segment in contact with the second cover segment until the retention line is cut by the cutter system whereupon the cover segments pivotably separate open about the hinge due to drag forces.

A ballast member is positioned within the forebody together with a battery pack and scoring means having a sensor component and radar signal generator positioned forward of the ballast member. The steel ballast member includes a conical surface which converges in a forward to aft direction and is inclined at an angle such that projectiles fired into the forebody aft of the ballast member are redirected in a direction away from the sensor component of the scoring means. The steel ballast member includes a plurality of (e.g., 4 equally spaced) threaded bolt holes for receipt of bolts which extend through the forebody casing so as to secure the ballast member and attached electrical components in fixed axial position.

The ballast member includes a plurality of sliding-/receiving grooves and the forebody includes a plurality of slides attached to an interior wall of the elongated main body so as to extend forward-to-aft. The slides have cross-sections conforming to the shape of the recesses and are spaced from one another such that the ballast member is adapted to slide along the slides when in a non-fixed state. In a preferred embodiment some or all of the bolts extend through the guides and into corresponding recesses formed in the ballast member.

The sensor and other components of the scoring means are secured to the ballast member so as to form the aforementioned unitary structure of package which is easily removable and replaceable.

The RF seal is positioned on a forward surface of said ballast member and aft of said components of the sensoring means.

The cover assembly preferably includes snap strings (nylon strings) connected with the cover segments and with the collapsible front end (e.g., vented inflator) of said visual augmenter.

The retention line provides maintenance means for maintaining the cover segments in contact with one another and secured to the aft end of the forebody (e.g., bearing against the aft end of the protruberances). The cutting system provides a release means for releasing the maintenance means such that the cover assembly is released from securement with the forebody and the cover segments separate about the hinge due to drag forces impinging upon the forward end of the cover assembly.

The cover assembly preferably includes a plurality of aperture pairs as well as snap strings threaded through the aperture pairs. The cover assembly also preferably includes a packing member (e.g., styrofoam) positioned so as to close the open end of the two secured cover segments. The packing includes an offset aperture through which the bracket assembly extends for connection with the swivel connector.

The snap strings, during the initial stages of cover segment separation, draw the front end of the visual augmenter at least partially open. During the later stages of cover segment separation, the snap string breaks so as to release the cover assembly from the visual augmenter being dragged by the forebody.

The aerial gunnery target system also includes a tow cable with an end terminal having a cylindrical head member at one end. The adapter assembly comprises an adapter housing, and end fitting, and a high transient force absorbing means (activated at and above 2,000 lbf). The adapter housing includes a hollow interior within which said end terminal and force absorbing means are retained. The force absorbing means is positioned between the head member of the end terminal and a surface defining a portion of the hollow interior. The end fitting is adjustably fixed to the adapter housing. The adapter assembly further includes means for pivotably retaining the adapter assembly joined to the forebody. The transient force absorbing means includes a plurality of belleville spring washers. The force required to collapse the spring washers is about 4,500 pounds while the springs begin to collapse at about 2,000 pounds force acting on the tow cable. For example, a towed augmenter subjected to a dragging force of 1,800 pounds force (lbf) is provided with a transient force absorber capable of withstanding 2,000 lbf prior to commencing to collapse. More generally, the absorber is designed to be activated only when the transient forces acting on the tow cable exceed 10 to 15% of the lbf acting on the cable when transient force are lacking.

The end fitting is threadably attached to the adapter housing and the adapter housing includes an elliptical conduit and the end fitting includes a through hole, and the means for joining the housing to the end fitting includes the aforementioned bracket with the pivotable pin member passing through the conduit and through hole.

BRIEF DESCRIPTION OF THE DRAWINGS

The present invention will be more fully understood from the detailed description given herein below and the accompanying drawings which are given by way of illustration only, and this are not limitative of the present invention, and wherein:

FIG. 3 shows a frontal view of the ballast member shown in FIG. 2;

FIG. 4 shows a cross-sectional view taken along line IV—IV in FIG. 3;

FIG. 7 shows a frontal view of the end cap shown in FIG. 2;

FIG. 8A shows a cut away view of the aft portion of the forebody shown in FIG. 2 including a portion of the deploy/release mechanism of the present invention;

FIG. 8B shows in greater detail the cutter mechanism shown in FIG. 8A;

FIG. 8C shows in front view the cam arrangement of the razor blade and the blade housing;

FIG. 9 shown in cross-section the adaptor assembly shown in FIG. 2;

DETAILED DESCRIPTION OF THE INVENTION

Figure 1:
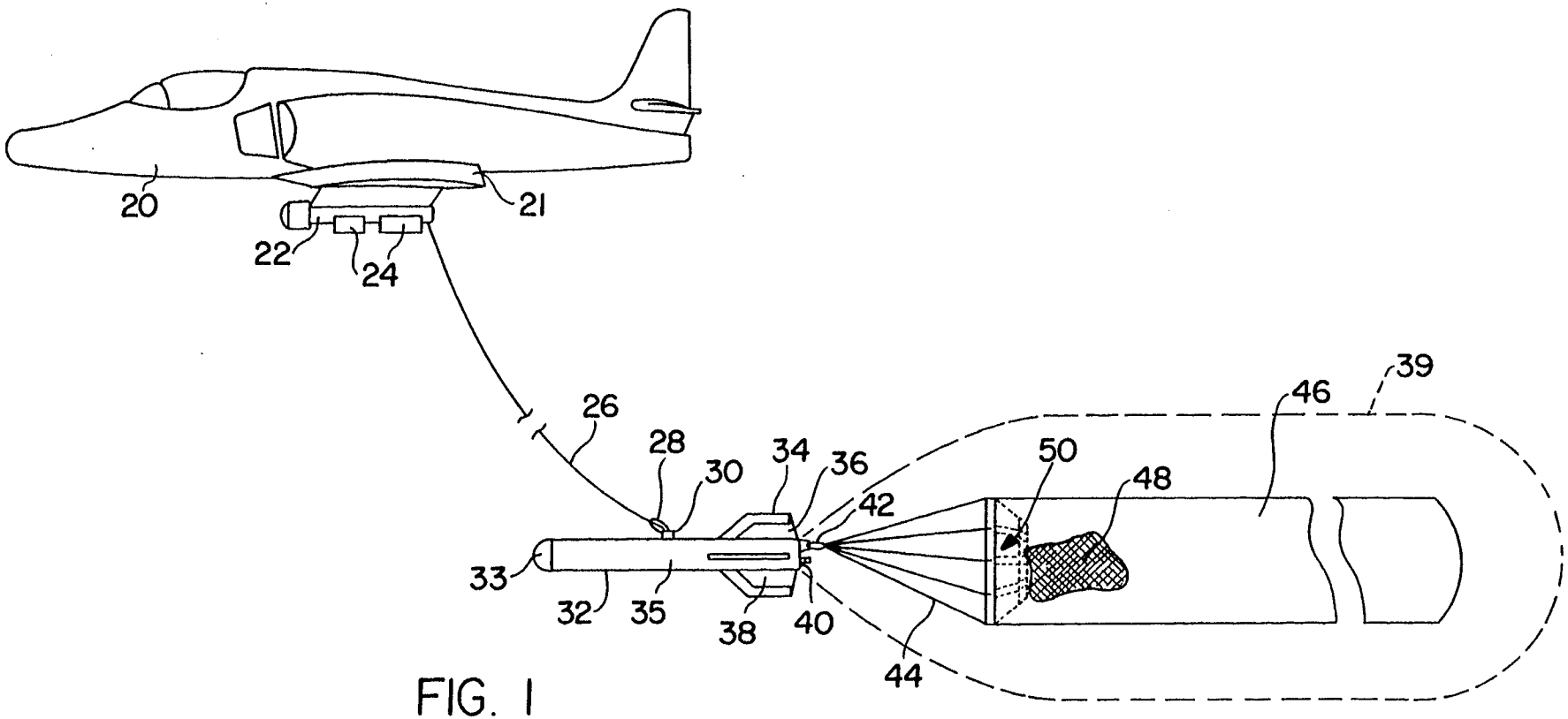
FIG. 1 illustrates the present invention with the visual augmenter fully deployed.

FIG. 1 illustrates towing plane 20 with tow reel pod 22 rigidly secured to the undersurface of wing 21. Tow reel pod 22 can be any conventional tow reel pod but the preferred embodiment is that which is described in co-pending application Ser. No. 07/627,330 filed Dec. 14, 1990 which is incorporated herein by reference. Extending downwardly off tow reel pod 22 is saddle assembly 24 which can take any form conventional in the art. Various other arrangements of the tow reel pod and saddle assembly is possible with the controlling factor being the design of the towing aircraft. For example, the tow reel pod can be fastened to the underbelly of the towing plane while the saddle can be attached to the tow reel pod or positioned separately such as under one of the wings. Extending from tow reel pod is tow cable 26. Tow reel pod 22 includes a device for reeling in or out tow reel cable 26 with the preferred towing length being 2,000 feet or more. Tow cable 26 is attached to adapter assembly 28 which, in turn, is attached to forebody 32 at bracket 30. Adapter 28 is secured to bracket 30 in a manner described in greater detail below. Forebody 32 includes nose cone 33 at its forward end. Nose cone 33 is preferably a spun aluminum member which is secured by screws to the cylindrical main body 35. At the aft end of main body or canister 35 extends main fins 34 which preferably comprise four separate fins spaced 90 degrees apart and extending about eight inches off from main body 35.

Also connected at the aft end of main body 35 is transmitting antenna fin 36 which is spaced between main fins 34 and preferably extends about six inches off of main body 35. Transmitting antenna fin 36 creates radar zone 39 surrounding visual augmenter 46. Radar zone 39 is the area into which the pursuing plane attempts to fire while avoiding direct hits to forebody 32, visual augmenter 46, and riser assembly 44. Spaced 180 degrees away from transmitting antenna fin 36 is receiving antenna fin 38 which detects projectiles passing through the radar zone 39 and transmits signals to sensing equipment positioned at the forward end of forebody 32.

Secured to the aft end of main body 35 is end cap 40. End cap 40 is secured to swivel connector 42 from which the riser lines of riser line assembly 44 diverge. The aft end of the riser lines forming riser line assembly 44 are attached to vented inflater assembly 50. The diamond shaped mesh body 48 of visual augmenter 46 is connected at its forward end to the forward end of vented inflator assembly 50. The swivel connector 42 enables visual augmenter 46 and riser line assembly 44 to rotate about a single point so as to avoid the twisting of either the riser lines or the mesh body 48 of visual augmenter 46.

Figure 2:
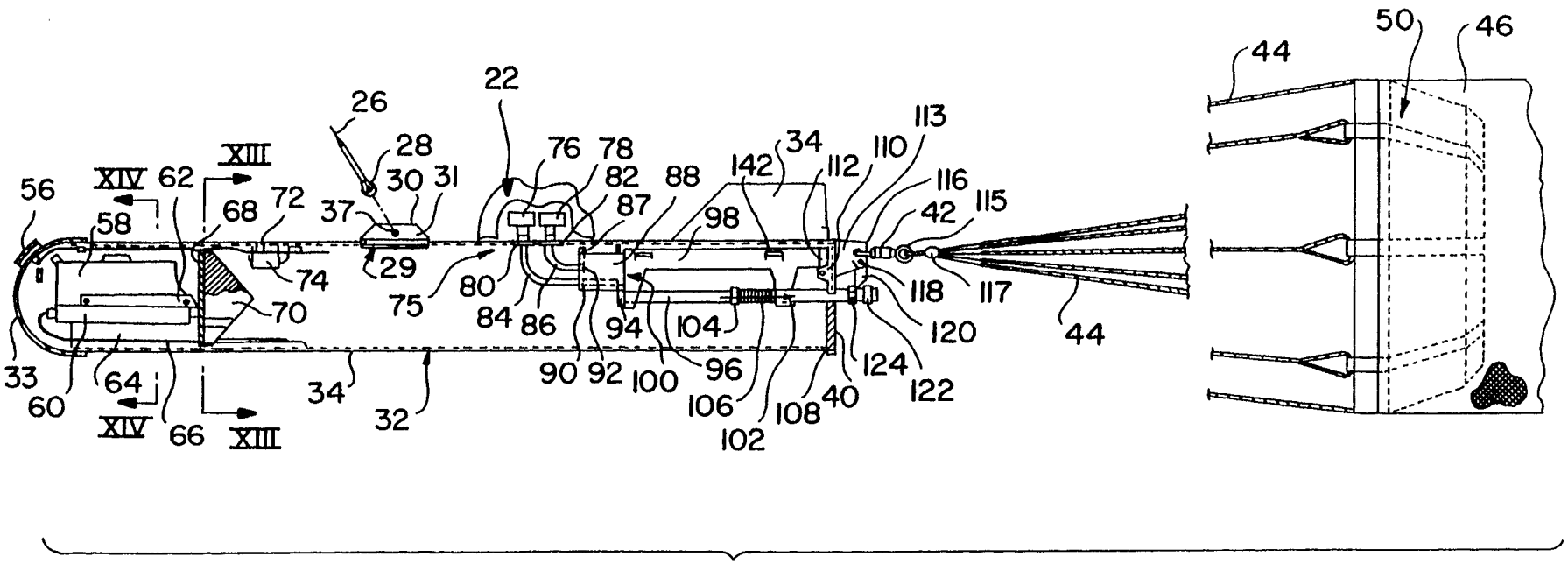
FIG. 2 shows a partially cut away side view of the present invention with the visual augmenter fully deployed.

FIG. 2 shows a broken away view of forebody 32, adapter 28, tow reel pod 22, and visual augmenter 46 with riser line assembly 44.

Attached to the upper portion of nose cone 33 is flat plate antenna 56 which transmits scoring signals to a receiver (not shown) positioned on the towing plane which, in turn, forwards scoring signals to the pursuing aircraft such that real-time electronic scoring is possible. Flat plate antenna 56 is electrically connected to a power source which is maintained within battery housing 58. Battery housing 58 is slidably confined within frame structure 60 which includes tray 62. RF sensor 64 is also electrically connected to the power source contained in battery housing 58 and to receiving antenna fin 38 (FIG. 1). Positioned behind RF sensor 64 is RF seal 68 which acts to prevent RF signals being transmitted by transmitter fin 36 from interfering with the electric equipment positioned forward of seal 68 and vice versa. A suitable RF seal includes that which is manufactured by Echo Absorb Company under the same brand name which acts to absorb and ground RF signals. Preferably the seal is dimensioned so as to be in close frictional contact with the interior of main body 35. Also as the seal is deformable the passage of electronic wiring past the seal is made possible.

RF seal 678 is secured (preferably by adhesive) to the forward surface of steel ballast member 70. Positioned aft of steel ballast member 70 is on/off switch housing 74 from which projects on/off contact 72. Contact 72 is positioned so as to be depressed and in an "off" position when forebody 32 is secured within saddle assembly 24. When forebody 32 is released from attachment with saddle assembly 24, contact 72 moves upwardly so as to place switch 74 "on" such that the electronic system is activated.

Bracket 30 is positioned aft of switch 74 and includes base 29 which is secured to the upper surface of main body 34 by screws or the like. Bracket 30 includes upwardly extending plates 31 (one shown) which are spaced from one another and include aligned bolt hole 37 (one shown). Adapter assembly 28 is dimensioned so as to be received between plates 31 and pivotably held in place by a pivot bolt (not shown) extending through bolt holes 37.

Deploy/release assembly 75 features forward driver pad 80 at the upper end of a detention means comprising pivoting lever 84 which pivots about pivot pin 90 formed in lever housing 88. Forward driver pad 80 is driven downwardly by forward driver 76 which is either added to tow reel pod 22 or originally formed therein. Forward driver 76 can take any conventional form such as an electric solenoid driver or a pneumatic driver.

The aft end of lever 84 abuts head 94 of rod 96. In a preferred embodiment, a visco-plastic (e.g., TEFLON (TM)) pad is provided at the forward end of head 94 or the aft end of lever 84. This lessens the driving force required by driver 76 to slide the end of lever 84 out of contact with head 94. Rod 96 extends through forward arm 100 and aft arm 102 of support structure 98. To facilitate sliding of rod 96 within the apertures formed in arms 100 and 102, a pair of semi-cylindrical blocks formed of a visco plastic material (not shown) are received in complementary recesses formed in the apertures in arms 100 and 102. Rod 96, which is preferably formed of steel, includes forward collar 104 fixedly attached to rod 96. Positioned between fixed collar 104 and arm 102 is compressed spring 106. Thus, when driver 76 forces lever 84 to pivot about pin 90 the end of lever 84 slides off of head 94 such that compressed spring 106 forces rod 96 to the left when considering FIG. 2. At the aft end of rod 96 is interior fixed collar 124 and exterior collar 122. Rod 96 also extends through aperture 132 (FIG. 5) formed in end cap 40.

With reference now to FIGS. 2, 5, 6A, 6B and 7, end cap 40 includes base member 41 having a shape somewhat similar to a bottle cap. End cap 40 is preferably a casted member formed of aluminum. Base member 41 of end cap 40 includes an outer wall 43 and a forwardly extending flange 45. Flange 45 is segmented about its periphery with thickened sections 110. Between adjacent thickened sections 110 are recesses 112. In a preferred embodiment, the internal diameter of flange 45 is about 10 inches such that it is in frictional contact with the aft end of main body 35 (which has about a 10 inch exterior) when slid in place. Recesses 112 allow for a limited degree of deflection so as to facilitate a tight fit between the aft end of main body 35 and end cap 40. As particularly shown in FIG. 5, thickened sections 110 have formed therein screw apertures 136. In a preferred embodiment there are about eight thickened sections and an equal number of screws extending through apertures 136.

Figure 5:
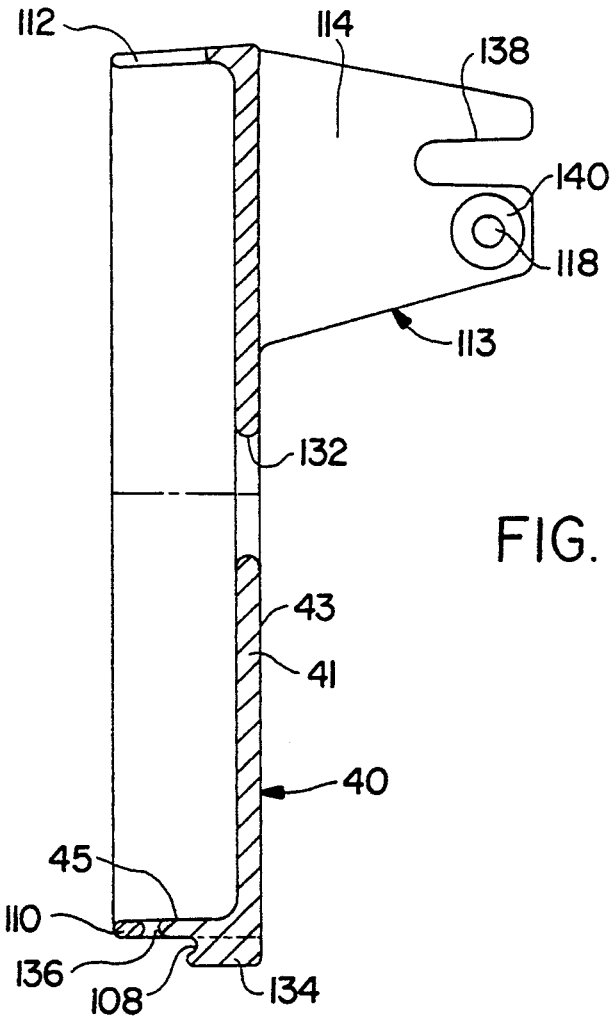
FIG. 5 shows a cross-sectional elevational view of the end cap shown in FIG. 2.
Figure 6A:
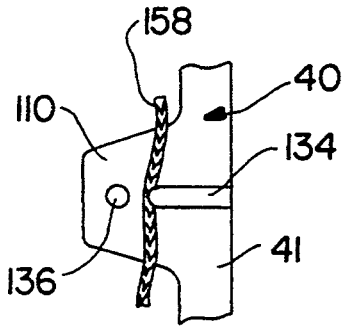
FIG. 6A shows a cut away planar view of the periphery of the end cap shown in FIG. 5.

As shown in FIGS. 5, 6A and 7, a plurality of protruberances 134 are equally spaced about the outer periphery of flange 45. In a preferred embodiment, eight of such protruberances are formed as part of the end cap 40. Protruberances 134 extend off of the flange section and have a notched recess 108 for maintaining in place retention line 158 (FIG. 8B), the purpose for which is described below.

When end cap 40 is in position at the aft end of main body 35, bracket assembly 113 is positioned off-center at the upper mid-section of base 41. Bracket assembly 113 includes spaced wall extensions 114 and 114'.

Figure 6B:
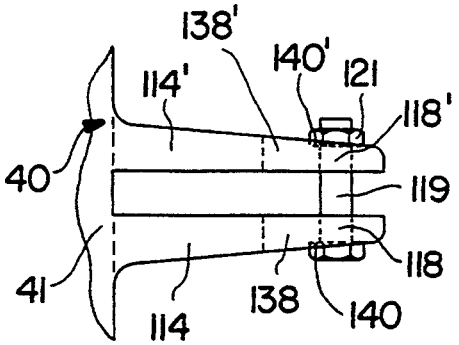
FIG. 6B shows a cut away planar view of the bracket assembly shown in FIG. 5.

As shown in FIGS. 5 and 6B, wall extension 114, 114' include pivot bolt holes 118, 118' which include counter bores 140, 140'. Pivot bolt 119 extends through aligned holes 118, 118' and features at least one detachable head member 121. Extensions 114, 114' also include slotted recesses 138, 138' which extend in the forward to aft direction.

Referring again to FIG. 2 there is illustrated single point contact member 120 which includes a hole through which pivot pin 119 extends as well as a lower section having an inclined end surface and an upper section extending above pivot point 118 as shown in FIG. 2. Single point contact member 120 is preferably formed of an aluminum or steel bar having a thickness sightly less than the width of the space between wall extensions 114, 114' so as to avoid binding during the pivotable movement of single point contact member 120. As also shown in FIG. 2, swivel connector 42 includes swivel connecting loop 116 at its forward end. Swivel connecting loop 116 is dimensioned so as to receive the upper end section of single point contact member 120. Swivel connector 42 also includes a aft loop 115 which is secured to securement member 117 of riser assembly 44. The thickness of loop 116 is such that it is adapted to slide within slots 138, 138'.

In the original attachment of swivel connector 42 to bracket assembly 113, lever 84 is depressed so as to position rod 96 in its forward most position wherein contact release member 120 assumes a position wherein its upper section is sufficiently clear of wall extensions 114, 114' to enable loop 116 to slide over the upper section of contact member 120. Rod 96 is then shifted to its aft most position such that the end of lever 84 is placed in contact with head member 94 so as to fix rod 96 in its aft most state. During the aft shifting of rod 96, release member 120 is pivoted counter clockwise (as shown in FIG. 2) until it is positioned between collars 122 and 124 and loop 116 is fixedly detained within bracket assembly 113.

When it is decided to release visual augmenter after a completion of target runs and following a reeling in of the previously reeled out forebody 32, driver 76 is activated causing lever 84 to pivot out of engagement with head 94. Once the end of lever 84 is out of engagement with head 94, lever, lever 96 is forced in a forward direction as spring 106 decompresses. The shifting of lever 96 forward causes exterior collar 122 also to shift. Thus, collar 122 rides along the inclined end surface of contact member 120 so as to gradually shift member 120 clockwise (with reference to FIG. 2) until the upper end of member 120 is sufficiently rotated clockwise (with reference to FIG. 2) to place the upper end of member 120 free of wall extensions 114, 114' and to allow loop 116 to slide off of the end of contact member 120.

Referring now to FIGS. 2, 8A, 8B, 8C, 14 and 14A, aft driver member 78 is positioned adjacent forward driver member 76 and is positioned directly above aft driver pad 82 which is provided at the forward end of aft lever 86. Aft lever 86 of the deployment system is pivotably retained by pin 92 which is supported by housing 88. Rod 142 is pivotably connected at one end to vertical extension 87 of lever 86. Rod 142 extends through appropriate guides 402, 404, 406 provided in support structure 98 from its connection at vertical extension 87 to its connection with cutting mechanism 144. Cutting mechanism 144 is rigidly secured by supported structure 98 near the interior periphery of flange 45 of end cap 40. A recess at the aft end of main body 35 is aligned with one of the recess in the end cap such that retention line 158 is received within sloped slot (e.g. 30°) 408 (FIG. 8B). Retention line 158 is also threaded through holes 194 formed in ears 192 of the visual augmenter cover assembly shown in FIG. 10A. The forward end 179 of cover assembly 178 is positioned so as to abut the periphery of base wall 41 of end cap 40 in the manner shown in FIG. 15A. Retention line 158 is threaded both through ears 192 and within the recesses 108 formed in protruberances 134 so as to compress the beaded rim of cover assembly 178 against the protruberances 134. By threading retention line 158 in snake-like fashion through ears 192, through the aperture 410 (FIG. 8A) formed at the aft end of cylinder 35, through cutter assembly 144 and within recesses 108, the cover assembly 178, with the enclosed folded visual augmenter and riser assembly, can be securely fashioned until it is desired to cut retention line 158 by activation of cutter assembly 144. In a preferred embodiment, a $\frac{1}{8}$ inch nylon string is threaded in the manner noted above.

When it is desired to deploy visual augmenter 46, aft driver 78 is activated by appropriate means in the cockpit of the towing plane (wiring with switch) so as to pivot lever 86 downward. As shown in FIGS. 8B and 8C, a downward pivoting of lever 86 results in vertical extension 87 pivoting counter clockwise causing a forward shift in rod 142. The forward shift in rod 142 causes the compression of spring 412 positioned between guide 402 and fixed collar 414. Rod 142 is pivotably fixed to lever 414 at pivot point 418. The forward movement of rod 142 causes lever 414 to pivot counterclockwise about pivot pin 416. The rotation of lever 414 results in cam bar (screw) 420 riding on the aft edge of blade member 422 with razor 424 extending forward therefrom. Blade member 422 is pivotably secured to blade housing 426 at pivot pin 428 such that when rod 142 shifts forward, lever 414 rotates, and cam bar 420 forces blade member 422 to rotate and cut through retention line 158.

Figure 14:
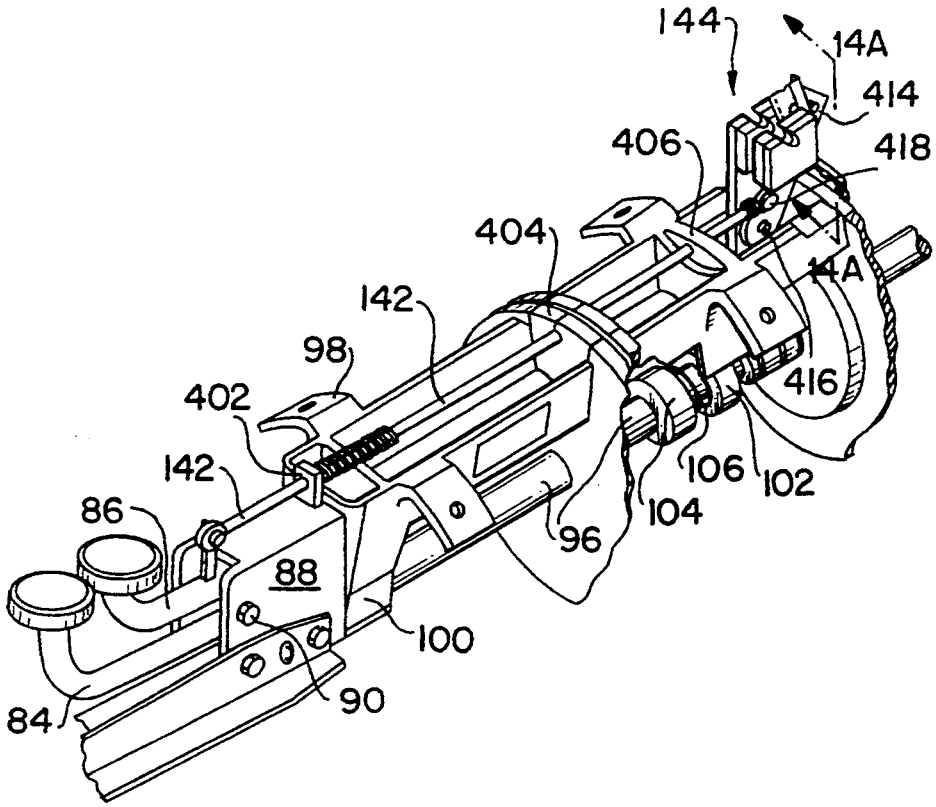
FIG. 14 shows in perspective the release/deployment system of the present invention.
Figure 14A:
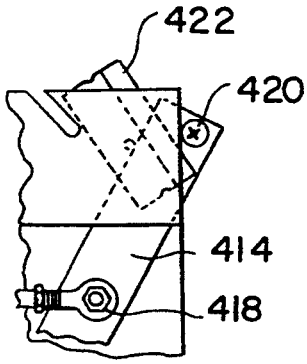
FIG. 14A shows in greater detail the cutter assembly shown in FIG. 14.

FIG. 14 shows a perspective view of the deployment and release systems shown in FIGS. 8B and 2. FIG. 14A shows in greater detail the cutting assembly of FIGS. 8B and 14.

Figure 10A:
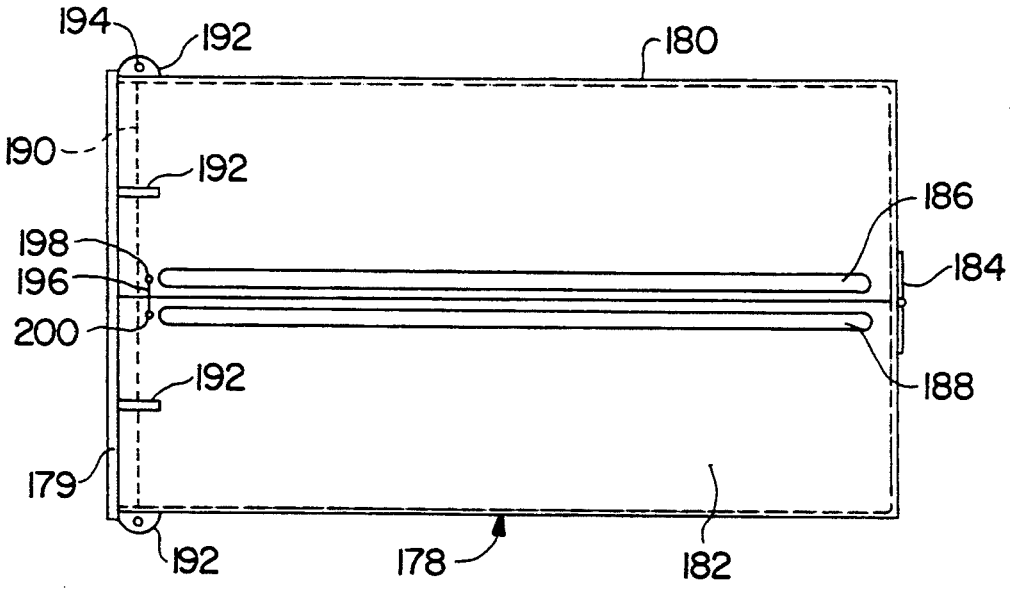
FIG. 10A shows an elevational side view of the visual augmenter cover assembly of the present invention.
Figure 10B:
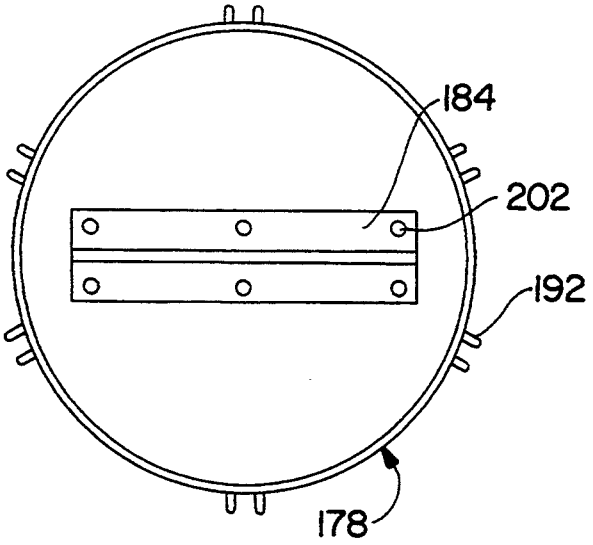
FIG. 10B shows a rear view of the cover assembly shown in FIG. 10A.
Figure 15A:
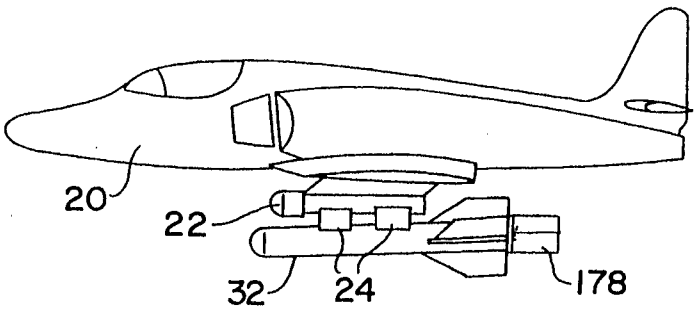
FIG. 15A shows a towing plane in flight with the gunnery target system of the present invention attached and with the visual augmenter in a stowage mode.
Figure 15B:
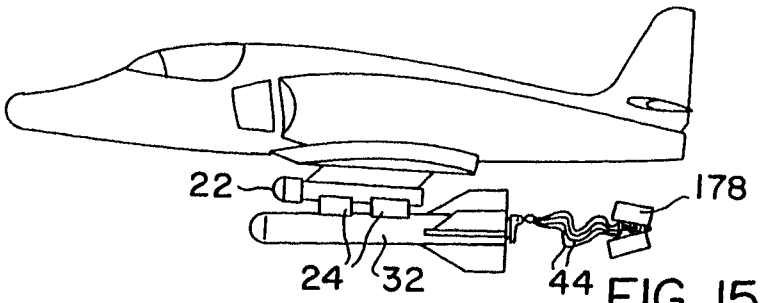
FIG. 15B illustrates the initial beginnings of the deployment of the visual augmenter while the forebody assembly remains attached to the tow reel pod.

Once retention line 158 is cut, upper cover segment 180 (FIGS. 10A and 10B) and lower cover segment 182 of cover assembly 178 begin to open up about hinge 184 due to the drag force on beaded end 190 of cover assembly 178. Hinge 184 is shown in FIGS. 10A and 10B to be a piece of flexible material such as polyurethane plastic which is fixed (e.g., rivets) to the aft end of upper and lower cover segments 180, 182. FIGS. 15A, 15B, 15C and 16 illustrate the sequence of visual augmenter deployment following the cutting of retention wire 158. As shown in FIG. 15A, forebody 32 is retained within saddles 24 with the visual augmenter packed within housing 178 and with the latter fixed to the aft end of forebody 32. Upon activation of aft driver 78, the sequence leading to the cutting of retention line 158 is begun. Once retention line 158 is cut, housing 178 begins to split apart and the stowed riser lines begin to unfold in the manner shown in FIG. 15B.

Figure 15C:
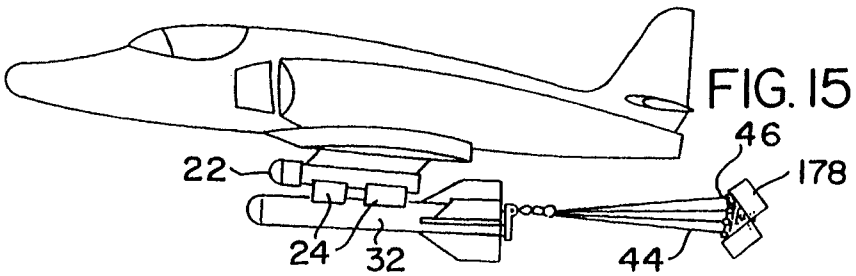
FIG. 15C shows further deployment of the visual augmenter.

Eventually riser lines 44 begin to draw taut by the drag force created by visual augmenter 46 and at around this time the separating cover assembly 178 assumes the position shown in FIG. 15C.

Figure 16:
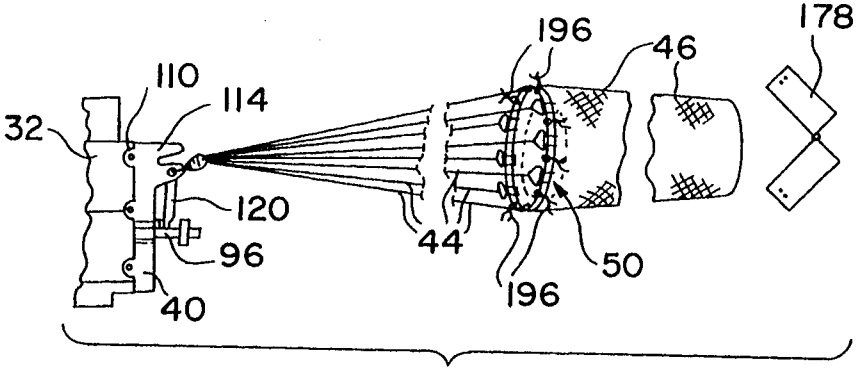
FIG. 16 shows the complete deployment of the visual augmenter with the visual augmenter cover assembly detached.

In a preferred embodiment of the invention, cover assembly 78 includes three or more pairs of holes 198, 200 equally spaced about the periphery of cover assembly 178 (one pair of holes being shown in FIG. 10A). In the preferred embodiment of the present invention. which utilizes a collapsible vented inflater, snap strings 196 are threaded through hole pairs 198, 200 and wrapped about the forward end of visual augmenter 46. The tensile strength and elasticity of strings 196 enables them to remain unbroken in the initial stages of separation of cover assembly 178. In this way, vented inflater 50 of visual augmenter 46 is ensured of a rapid opening which facilitates the opening of the diamond shaped mesh cylinder extending aft of vented inflater 50. At the appropriate time, the drag force on the split apart cover assembly 178 is sufficient so as to break snap strings 196 whereupon cover assembly 178 flies off. FIG. 16 illustrates the discarding of cover assembly 178 following breakage of snap strings 196. In a preferred embodiment, the snap strings are nylon strings which break at 25 pounds force.

Figure 11:
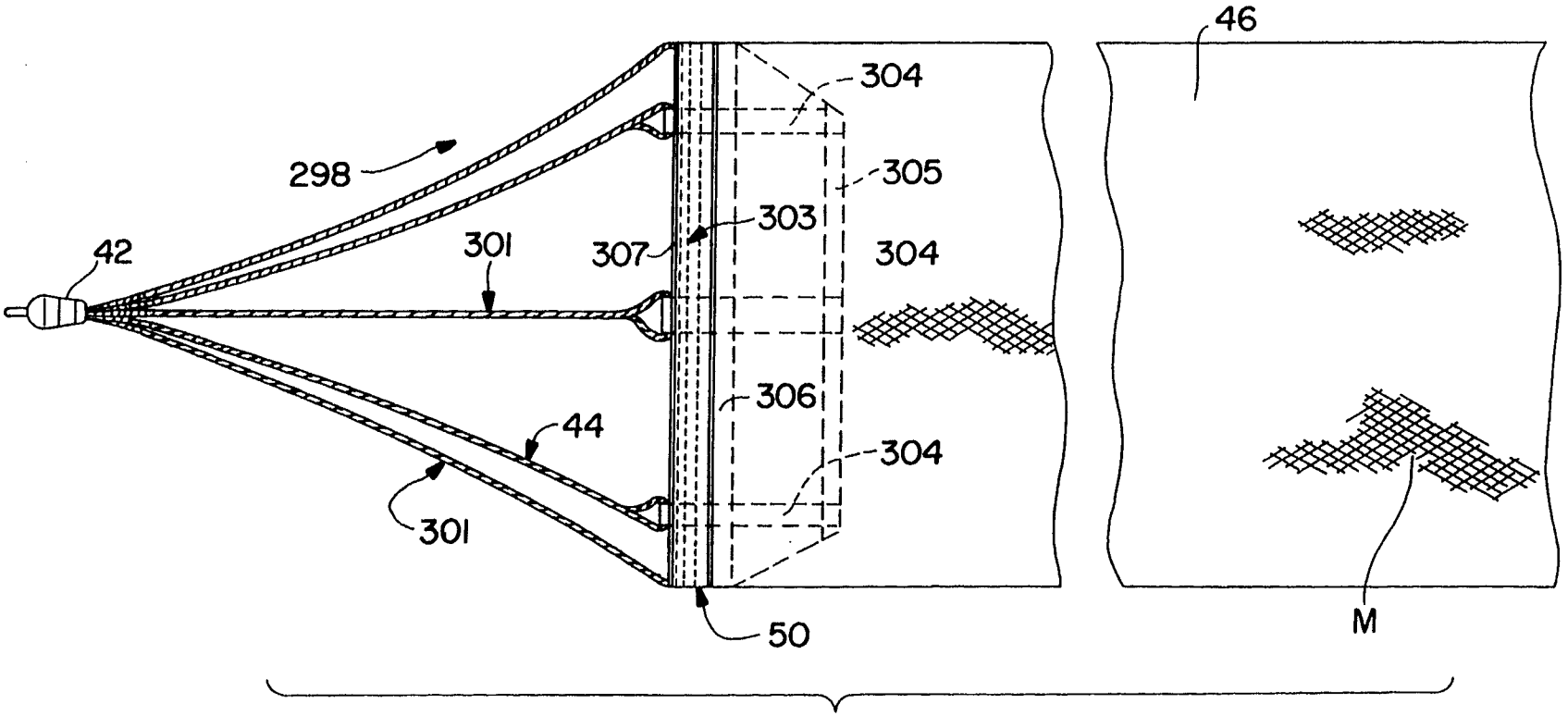
FIG. 11 shows in greater detail the visual augmenter system shown in FIG. 2.

FIG. 11 shown a more detailed view of the visual augmenter system 298 which features rise line assembly 44 with riser lines 301. Attached to the rearward end of riser lines 301 is vented inflator 50 which includes hoop shaped forward connection means 303 and hoop shaped rearward connection means 305 longitudinally displaced from one another. A plurality of attachment members 304 extend between the forward and rearward connection means and position rearward connection means 305 at an incline with respect to in rushing air.

Figure 12:
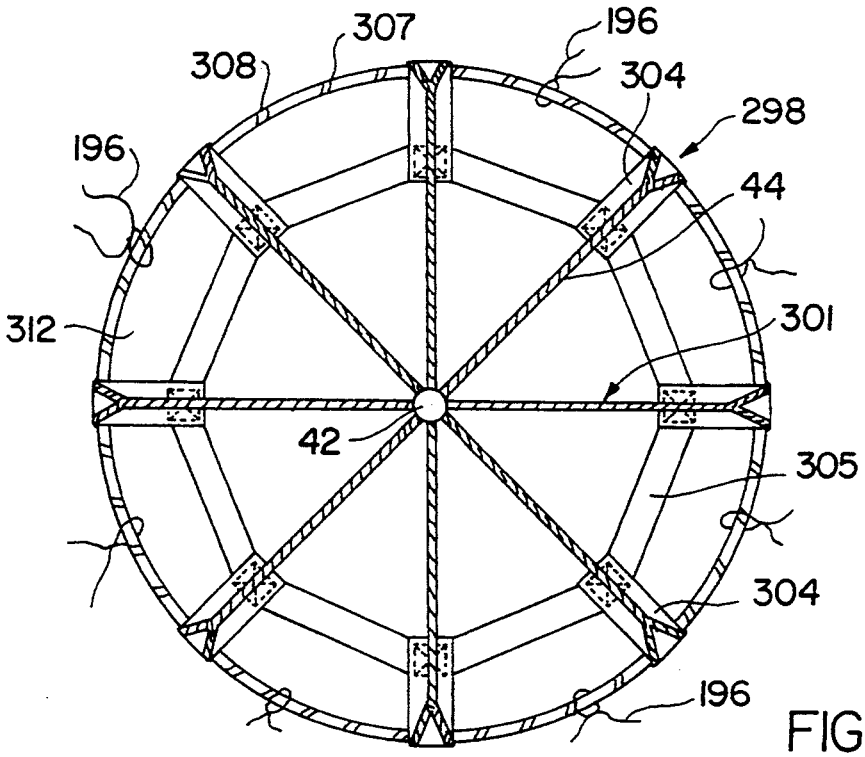
FIG. 12 shows a frontal view of that which is shown in FIG. 11.

FIG. 12 shows the front view of visual augmenter system 298 having riser line assembly 44 with riser lines 301 extending to a common connection point at swivel 42. At the forward portion of vented inflator 50 is bead 307. As shown, attachment members 304 incline inwardly to connect with rearward connection means 305 to form a plurality of air vents 312.

Thread 308 is wrapped about bead 307 and the forward end of visual augmenter 46 formed of mesh M. The vented inflator makes unnecessary the use of frame structures to maintain the front opening of a visual augmenter in an open state. Moreover, the vented inflator of the present invention allows for non-rigid and non-radar reflective material to provide the required opening at the front of a visual augmenter.

Once the visual augmenter 46 is properly deployed aft of forebody 32, an appropriate release device is activated such that saddle members 24 become disconnected from forebody 32. Upon disconnection, forebody 32 is drawn aft while tow cable 26 is unreeled by tow pod reel 22. At this time, contact 72 is released such that the electronic scoring system of forebody 32 is activated. Forebody 32 is dragged in the aft direction while tow cable 26 is extended from tow pod reel 22 to a length which is appropriate (2000 feet) as shown in FIG. 1.

FIGS. 2, 3 and 4 illustrate the unique arrangement of the sensitive electronic equipment within forebody 32. Previous designs positioned the RF sensor in the mid to aft portion of the forebody. The previous designs relied upon a heavy (and expensive) lead disk weight positioned at the forward end of the forebody to place the center of gravity in line with the tow cable connection point.

As previously discussed, FIG. 2 shown sensor 64 positioned forward of RF seal 78 and ballast member 70. This positioning avoids the requirement for a lead ballast weight and allows the use of a less costly material for ballast member 70. In the present invention, ballast member 70 is a steel member having a cone shape. As shown in FIG. 3, ballast member 70 has a planar forward surface with screw holes 126 formed therein. Screw holes 126 receive screws which pass through aligned holes formed in frame structure 60 and RF seal 68. In this way, ballast member 70 is made a component of the unitary assembly comprises of ballast member, seal and sensitive electronic equipment positioned forward of the seal (excluding antennae 56).

Spaced about the periphery of ballast member 70 are a multitude of sliding/receiving grooves 130 as well a as deeper multi-wire recess 128. FIG. 4 reveals the cone shaped of ballast member 70 which has a converging surface in the forward to aft direction. As shown in FIG. 4, the surface of member 70 converges at angle X which is in a preferred embodiment is 45°. A problem experience with previous forebody designs was that projectiles fired by pursuing planes would pass up along the central axis of the forebody and through the ballast member or would rapidly deteriorate the ballast member through spalling so as to damage the sensitive electronic equipment forward of the ballast member. In the present invention, however, the arrangement of the ballast member is such that any projectile travelling along or in the general direction of the central axis of the forebody is deflected out through main body 35 without damaging the sensitive electronic equipment and without seriously degrading the ballast member. The holes in the main body 35 caused by the redirected projectiles can be easily patched such the life of the forebody is extended through quick and easy repair.

Figure 13:
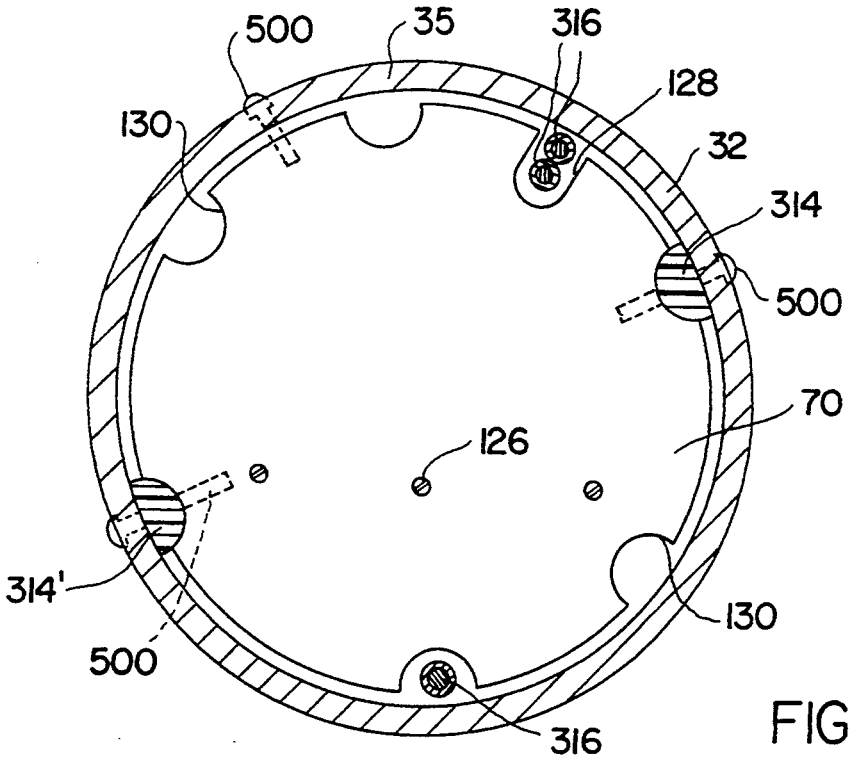
FIG. 13 shows a cross-sectional view taken along line XIII—XIII in FIG. 2 with the cut out portion of FIG. 2 replaced.

The unitary nature of the ballast member 70 and the positioning of sensitive electronic equipment forward of the ballast member allows for quick and easy repair and replacement. FIG. 13 is a view taken along line XIII—XIII in FIG. 2 (with the portion of the forebody removed in FIG. 2 replaced). FIG. 13 illustrates ballast member 70 in position within main body 35. As illustrated, one or more of sliding/receiving grooves 130 provides a recess for receiving electrical cables 316 such as that extending between the sensor 64 and receiving fin 38. Also, multi-wire recess 128 is dimensioned to receive a plurality of wires such as those extending between the power source transmitting antennae fin and the on/off switch.

FIG. 13 also shows sliders 314, 314' which have a cross-section matching the shape of the sliding/receiving grooves 130. Sliders 314, 314' extend in a forward to aft direction and preferably originate at the forward end of main body 35 and extend aft to behind the final resting position of ballast member 70.

FIGS. 3 and 13 also illustrate the manner in which the unitary package comprised of the power pack, electronic equipment, supporting frame structure, seal and ballast member is fixed from sliding axially within the forebody. As shown in FIGS. 3 and 13 bolts 500 extend through aligned holes in the forebody and into threaded bolt holes 502. In a preferred embodiment, the bolts 500 extend through sliders 314, 314' as well as through non-recessed portions of the forward periphery of ballast member 70. Preferably, four bolts spaced 90° apart are used to retain the unitary package in fixed axial position.

Sliders 314 and 314' are shown to be diametrically opposed to one another and semi-circular in cross-section. Each slider is fixed in position with screws or the like. The tolerances between grooves 130 and sliders 314, 314' are such that ballast member 70 can be easily slide out yet are tight enough so as to avoid non-axial movement of ballast 70 with respect to main body 35. The sliders and complimentary grooves can be formed in different shapes such as full or nearly full circular cross-section and complimentary recesses can be formed in the interior of main body 35 if further retention is desired. Also, one of more additional sliders can be utilized for further retention although two sliders is preferred from the standpoint of easy removal of ballast 70.

FIG. 9 illustrates, in cross-section, adaptor assembly 157 having housing 159. Housing 159 includes threaded housing extension 168 and an internal hollow 161 for receiving end terminal 160 of tow cable 26. End terminal 160 includes sliding head 162 which slides a piston-like fashion within an enlarged portion of internal hollow 161. Belleville washers 166 surround a portion of end terminal 160 and are retained between shoulder 163 and head 162.

Housing extension 168 has elliptical conduit 174 extending therethrough. As shown in FIG. 9, threaded end fitting 170 is threadably engaged with housing extension 168. End fitting 170 has a curved aft section and bolt aperture 171 extending therethrough and in alignment with elliptical conduit 174.

When visual augmenter 46 is being towed at about 100 KNTS, tow cable 26 is subjected to a drag force of about 1,800 pounds force (1 bf). During a target run additional transient forces act upon tow cable due to whipping and snapping activity of the tow cable typically brought about by forward-to-aft or side-to-side shifts in forebody 32 upon being hit by projectiles as well as variations in the flight of the tow plane (e.g., slowing-down/speeding up—sharp turns). To lessen the tensile stress on tow cable 26 when high transient forces develop (e.g., 2,000 lbs or above), washers (or transient force absorption means) 166 are each set to begin compression at about 2,000 lbf and collapse entirely at about 4,500 lbf. Thus, washers 166 flatten at times when cable 126 would otherwise be faced with a rapid increase in tensile stress brought about by the introduction of transient forces on the two cable. A tensile steel (0.182 inch diameter) tow cable extendable to 2,000 ft or more is suitable for the purposes of the present invention. Such a cable is considered to have a 5,700 lbf breaking point with the factor of safety of 1.25 incorporated into that value. To prevent high transient forces from breaking tow cable 26 (e.g. forces above 2,000 lbf acting on the cable) the washer are set to begin absorbing forces about 2,000 lbf up to about 4,500. In this way the rapid introduction of transient forces on the cable is absorbed and damped so as to further ensure that the cable does not break. Forces below 2,000 lbf do not cause the collapsing of spring washers thus providing a high end absorption means which is only activated at times when it is actually required. The choosing of a 2,000 lbf washers is the most preferred embodiment for the present invention although various other setting are possible depending on the circumstances. Generally, the washers should have a collapsing point which is about 10 to 15% of the pounds force acting on the tow cable when essentially no transient forces are acting on the cable (e.g.).

Adaptor assembly 157 also provides a unique tightening down arrangement which is relied upon for proper stowage of forebody 32. As shown in FIG. 9, the housing of tow pod reel 22 is formed with an aperture 165 which is dimensioned to receive adaptor assembly 157. Adaptor assembly 157 includes notched recess 164 which is dimensioned to receive the housing of tow reel pod 22 in a fixed relationship. A pivot bolt (not shown) extends through holes 37 in bracket 30 and through holes 175 formed in end fitting 170. Thus, pivotable end fitting 170 is prevented from shifting from its pivot axis.

Although the present invention has been described with reference to a preferred embodiment, the invention is not limited to the details thereof. Various substitutions and modifications will occur to those of ordinary skill in the art, and all such substitutions and modifications are intended to fall within the spirit and scope of the invention as defined in the appended claims.

What is claimed is:

1. An apparatus for use with a towed member, comprising:

a bracket assembly;

a support structure;

a rod supported by said support structure and adapted to shift with respect to said support structure and *said* bracket assembly between a first rod position and a second rod position, *said rod having a first end and a second end;* a biasing device in contact with said rod;

a movable detention device having a first position wherein said detention device is in contact with said rod *at a first rod contact location* so as to maintain said rod in said first rod position, and said detention device having a second position wherein said detention device is positioned such that said biasing device shifts said rod to said second rod position;

a contact member supported by said bracket assembly and retained in a first contact member position by said rod when said rod is in said first rod position and positioned so as to be moved to a second contact member position upon a shifting of said rod from the first rod position to the second rod position, and wherein said bracket assembly and contact member are dimensioned and arranged so as to fix the towed member in place when said rod is in said first rod position and release the towed member when said rod is in said second rod position, *and said contact member being positioned such that said contact member is adapted for contact with said rod at a second rod contact location on said rod proximate the second end of said rod, and said first rod contact location being axially spaced apart along said rod from said second rod contact location.*

2. An apparatus as recited in claim 1 wherein said movable detention device includes a pivoting lever having an end section which abuts a first end of said rod when said movable detention device is in said first position.

3. An apparatus as recited in claim 2 wherein the first end of said rod includes a head member having a visco plastic surface which is in contact with the end of said pivoting lever when said detention device is in said first position, said visco plastic surface facilitating movement of the end section of said lever out of an abutting relationship with said head member when said lever pivots to the second position of said detention device.

4. An apparatus as recited in claim 1 wherein said support structure includes a pair of spaced apart arms having bearing surfaces for receiving said rod through said arms, said rod including a first collar and said biasing device including a spring positioned between said first collar and the arm furthest from the first end of said rod, and said spring being in a compressed state when said rod is in said first rod position.

5. An apparatus as recited in claim 4 wherein said rod includes a second and a third collar positioned in spaced apart relationship at the second end of said rod, said collars being positioned on opposite sides of said contact member when said rod is in said first rod position, and said third collar being spaced further from the first end of said rod than said second collar.

6. An apparatus as recited in claim 5 wherein said contact member includes an inclined edge which slopes away from said third collar and towards said second collar such that said inclined edge forms a cam surface with respect to said third collar, and said third collar is adapted to ride upon said cam surface as said rod shifts from said first to second position.

7. An apparatus as recited in claim 6 wherein said contact member is pivotably fixed to said bracket assembly such that said contact member pivots with respect to said bracket assembly when said third collar rides upon said cam surface.

8. An apparatus as recited in claim 7 wherein said bracket assembly includes a pair of spaced wall extensions positioned on opposite sides of said pivoting contact member, said wall extensions each including a slot, and said contact member having a section above the pivot axis of said contact member which is dimensioned to receive thereabout a section of the towed member when said rod is in said second rod position, and said slots being dimensioned to receive therein the section of said towed member so as to fixedly retain the towed member to said bracket assembly when said rod is in said first rod position.

9. An apparatus as recited in claim 7 wherein said collars are sufficiently spaced apart such that said contact member is free to pivot to a position in between said collars while said rod is being shifted from the second rod position to said first rod position.

10. An apparatus as recited in claim 1 further comprising a cutting system which comprises;

a first lever pivotably fixed to said support structure, said lever including an extension member;

a rod member pivotably attached at one end to said extension member;

a cutting assembly fixed with respect to said support structure, said cutting assembly including a cutter housing and a blade assembly movably retained within said cutter housing, said rod member having a second end fixed to a second lever pivotably supported by said cutter housing, said second lever adapted to abut said blade assembly such that upon pivoting of said first lever, said extension member shifts position so as to shift said rod member and said second lever so as to move said blade assembly.

11. An apparatus as recited in claim 10 further comprising a spring member biasing said rod in an aft direction.

12. An aerial gunnery target system, comprising:

a forebody having means for connection with a tow cable;

an end cap securely fixed to said forebody, said end cap having a base section and a flange section;

securement means for securing said flange section to the aft end of said forebody, and said end cap further including a bracket assembly extending off of said base member in a forward to aft direction, said bracket assembly including means of fixing a towed member to said end cap.

13. A system as recited in claim 12 wherein said forebody includes a nose cone and a cylindrical shaped main body, said end cap being secured to the aft end of said cylindrical main body, and said bracket assembly being radially spaced from a central axis of said cylindrical shaped main body.

14. A system as recited in claim 13 wherein said flange section of said end cap includes a plurality of thickened portions separated by recesses, and said securement means including members extending through said thickened portions and the aft end of said main body.

15. A system as recited in claim 13 wherein said base member has an aperture formed in a central portion of said base member.

16. A system as recited in claim 12 further comprising a tow member release assembly comprising:

a support structure;

a rod supported by said support structure and adapted to shift with respect to said support structure between a first rod position and a second rod position;

a biasing device in contact with said rod;

a movable detention device having a first position wherein said detention device is in contact with said rod so as to maintain said rod in said first rod position, and said detention device having a second position wherein said detention device is positioned such that said biasing device shifts said rod to said second rod position;

a contact member supported by said bracket assembly and retained in a first contact member position by said rod when said rod is in said first rod position and positioned so as to be moved to a second contact member position when said rod shifts to said second rod position, and said bracket assembly and contact member being dimensioned and arranged so as to fix the towed member to said bracket assembly when said rod is in said first position and release the towed member when said rod is in said second rod position.

17. A system as recited in claim 12 wherein said flange section of said end cap includes a plurality of protruberances spaced about the exterior periphery of said flange section with said protruberances including a line retention recess formed at a forward end of said protruberances.

18. A system as recited in claim 17 further comprising a compactable visual augmenter assembly and a cover assembly to cover the compacted visual augmenter assembly, said visual augmenter assembly further comprising a retention line threaded through wire receiving means formed in said cover assembly, and said retention line being adapted to hold said cover assembly to said forebody when said retention line is received within the line retention recesses formed in said protruberances.

19. A system as recited in claim 12 further comprising a cutter system which comprises;

a first lever pivotably fixed to said support structure, said lever including an extension member, a rod member pivotably attached at one end to said extension member, a cutting assembly fixed with respect to said support structure, said cutting assembly including a cutter housing and a blade assembly retained within said cutter housing, said rod member having a second end fixed to a second lever pivotably supported by said lever housing, said second lever adapted to abut said blade assembly such that upon pivoting of said first lever, said extension member shifts so as to shift said rod member and move said second lever so as to move said blade assembly.

20. A system as recited in claim 18 wherein said cover includes a first cover segment and a second cover segment and a hinge joining said first cover segment to said second cover segment at an aft end of each of said cover segments, and said retention line being arranged so as to maintain said first cover segment in contact with said second cover segment until said retention line is cut by said cutter system whereupon, when said visual augmenter assembly is being towed, said cover segments separate by pivoting open about said hinge due to drag forces.

21. An aerial gunnery target system, comprising:

a forebody having an elongated main body extending in a forward to aft direction;

means to attach said forebody to a tow cable;

a ballast member positioned in said forebody;

scoring means having a component which is positioned forward of said ballast member, and said ballast member including a converging surface which converges in a forward to aft direction and is inclined at an angle such that projectiles fired into said forebody aft of said ballast member are redirected in a direction away from said component of the scoring means.

22. A system as recited in claim 21 wherein said ballast member is conical in shape.

23. A system as recited in claim 22 wherein said ballast member is comprised of steel.

24. A system as recited in claim 21 wherein said ballast member includes a plurality of sliding receiving grooves and said forebody includes a plurality of slides attached to an interior wall of said elongated main body so as to extend forward-to-aft, said slides having cross-sections conforming to the shape of said recesses and being spaced from one another such that said ballast member is adapted to slide along said slides when non-fixed along the central axis of the main body.

25. A system as recited in claim 23 wherein components of said scoring means are secured to said ballast member so as to form a unitary structure.

26. A system as recited in claim 21 further comprising an RF seal positioned on a forward surface of said ballast member and aft of said components of said sensor.

27. An aerial gunnery target system, comprising:

a forebody adapted for being towed by an aircraft and said forebody having an aft end;

a visual augmenter assembly having a collapsible front end, a collapsible main body, riser lines, and a connector connecting said riser lines to said forebody;

a cover assembly dimension to receive therein said visual augmenter assembly when in a collapsed state, said cover assembly including a first cover segment, a second cover segment, and a hinge pivotably joining the aft ends of said cover segments;

snap strings connected with said cover segments and with the front end of said visual augmenter;

maintenance means for maintaining said cover segments in contact with one another and secured to the aft end of said forebody;

release means for releasing said maintenance means such that said cover assembly is released from securement with said forebody and said cover segments separate about said hinge due to drag forces impinging upon the forward end of said cover assembly as the forebody is being towed;

said snap strings being dimensioned and arranged such that during the initial stages of cover segment separation said snap strings draw the front end of said visual augmenter at least partially open and during the later stages of cover segment separation said snap strings break so as to release said cover assembly from said visual augmenter being dragged by said forebody.

28. An aerial gunnery target system as recited in claim 17 wherein said maintenance means includes a line.

29. An aerial gunnery target system as recited in claim 28 wherein said release means includes a line cutter.

30. An aerial gunnery target system, comprising:

a tow cable with an end terminal, said end terminal including a head member at one end;

an adapter assembly comprising an adapter housing, an end fitting, and transient force absorbing means, said adapter housing including a hollow interior within which said end terminal and force absorbing means are retained, said force absorbing means being positioned between the head member of said end terminal and a surface defining a portion of the hollow interior, said end fitting being adjustably fixed to said adapter housing, and means for pivotably retaining said adapter assembly joined to said forebody.

31. A system as recited in claim 30 wherein said transient force absorbing means include a plurality of belleville spring washers.

32. A system as recited in claim 31 wherein the force required to initiate the collapse of said spring washers is 2000 pounds force.

33. A system is recited in claim 30 wherein the force required to initiate collapsing of said transient force absorbing means is between 10 to 15% above the pounds force acting on said tow cable when said visual augmenter is fully deployed and transient forces are not considered.

34. A system as recited in claim 30 wherein said end fitting is threadably attached to said adapter housing and said adapter housing includes a conduit and said end fitting includes a through a hole, and said means for joining includes a bracket with a pivotable pin member adapter to pass through said conduit and through hole.

35. A method for releasing a visual augmenter, comprising:

activating a driver member so as to release a detention member so as to cause a shifting of a rod member from a first position to a second position such that a member on said rod moves along a cam of a contact member so as to cause said contact member to shaft from a visual augmenter fixing position to a position wherein said visual augmenter slides off of said contact member.

36. A method for deploying a visual augmenter, comprising:

activating a driver member so as to move a lever with the movement of the lever causing a shifting in a guided wire which is connected to a cutting mechanism such that said cutting mechanism cuts a retention wire holding a cover assembly housing the visual augmenter to the forebody member, cutting of said retention wire and drag forces impinging on said cover assembly causing the movement of said cover assembly aft of said forebody and the separation of hinged cover segments of said cover assembly, the separation of said cover segments causing snap strings joining said visual augmenter to said cover segments to break after at least partially opening a forward end of said visual augmenter.

*37. An apparatus as recited in claim 1 wherein said first contact location is positioned closer to said first end of said rod than said second contact location.*

*38. An apparatus for use with a towed member, comprising:*

*a support structure;*

*a bracket assembly supported by said support structure and extending out away from said support structure;*

*a rod supported by said support structure and adapted to shift with respect to said support structure and said bracket assembly between a first rod position and a second rod position,*

*a biasing device in contact with said rod;*

*a movable detention device having a first position wherein said detention device is in contact with said rod so as to maintain said rod in said first rod position, and said detention device having a second position wherein said detention device is positioned such that said biasing device shifts said rod to said second rod position;*

*a contact member supported by said bracket assembly and retained in a first contact member position when said rod is in said first rod position and positioned so as to be moved to a second contact member position upon a shifting of said rod from the first rod position to the second rod position, and wherein said bracket assembly and contact member are dimensioned and arranged so as to fix the towed member in place when said rod is in said first rod position and release the towed member when said rod is in said second rod position, and said contact member having a first end, an intermediate area and a second end, said intermediate area being pivotably supported by said bracket assembly, said first end securing the towed member when said rod is in said first rod position and said second end being adapted for shifting when said rod shifts from said first to said second rod position.*

* * * * *